United States Patent [19]

Soboroff et al.

[11] 4,256,557

[45] Mar. 17, 1981

[54] COPPER ELECTROWINNING AND CR+6 REDUCTION IN SPENT ETCHANTS USING POROUS FIXED BED COKE ELECTRODES

[75] Inventors: David M. Soboroff, Rockville, Md.; Hector O. McDonald, Rolla, Mo.

[73] Assignee: The United States of America as represented by the Secretary of the Interior, Washington, D.C.

[21] Appl. No.: 85,449

[22] Filed: Oct. 16, 1979

[51] Int. Cl.³ .......................... C25C 1/12; C25C 7/02; C02C 5/12

[52] U.S. Cl. ................................. 204/149; 204/52 R; 204/97; 204/130

[58] Field of Search ............... 204/130, 149, 152, 97, 204/52 R

[56] References Cited

U.S. PATENT DOCUMENTS

| | | | |
|---|---|---|---|
| 883,170 | 3/1908 | Christy | 204/130 X |
| 1,851,603 | 3/1932 | Thomas | 204/97 X |
| 3,679,557 | 7/1972 | Gilby et al. | 204/152 X |
| 3,682,796 | 8/1972 | Dev Bedi et al. | 204/97 X |
| 3,804,733 | 4/1974 | Bennion et al. | 204/130 X |
| 3,896,013 | 7/1975 | Zievers | 204/130 X |
| 3,915,822 | 10/1975 | Veltman | 204/130 X |
| 3,919,062 | 11/1975 | Lundquist, Jr. et al. | 204/130 X |
| 3,966,571 | 6/1976 | Gagnon et al. | 204/130 X |

Primary Examiner—Arthur C. Prescott
Attorney, Agent, or Firm—William S. Brown; Donald A. Gardiner

[57] ABSTRACT

Exhausted $Cr^{+6}$ oxidizing solutions containing $Cu^{+2}$ values are electrolyzed by placing an exhausted $Cr^{+6}$ etching or oxidizing solution containing copper ion and $Cr^{+3}$ ions in an electrolytic cell containing at least one pair of carbon particle electrodes, and forcefully flowing the exhausted solution through the electrodes and simultaneously impressing a direct current across the electrodes such that at the cathode divalent copper is reduced to copper metal and $Cr^{+6}$ values are reduced to trivalent chromium and at the anode water is oxidized to oxygen.

9 Claims, 2 Drawing Figures

COPPER ELECTROWINNING AND CR$^{+6}$ REDUCTION IN SPENT ETCHANTS USING POROUS FIXED BED COKE ELECTRODES

BACKGROUND OF THE INVENTION

1. Field of the Invention

The present invention relates to the treatment of exhausted Cr$^{+6}$ oxidizing solutions by electrolysis. More particularly, the present invention relates to the electrolysis of exhausted Cr$^{+6}$ solutions which contain divalent copper ions in an electrolysis cell containing carbon particle electrodes such that Cr$^{+6}$ and Cu$^{+2}$ and simultaneously reduced to Cr$^{+3}$ and copper metal respectively.

2. Description of the Prior Art

Oxidizing solutions based upon hexavalent chromium in aqueous sulfuric acid have been employed in cleaning and etching operations in the treatment of plastics for plating, in brass finishing, in printed circuit board etching, in anodizing and in other surface treatments. As the oxidizing solutions are used, Cr$^{+6}$ is reduced to Cr$^{+3}$ and the dissolved solids content increases while the effective acid concentration diminishes. However, after use of such cleaning solutions, the problem which remains is disposal of the spent etching solutions, i.e. solutions whose etching rate is less than that required for a given operation.

In the past substantial quantities of chromium values have been lost through discard of the solutions. Moreover, the technology for the ultimate disposal of chromium wastes usually requires the reduction of remaining Cr$^{+6}$ to Cr$^{+3}$. The solution containing trivalent chromium is then treated with a base to precipitate chromium values and other extraneous metals present as the hydroxides. The solid sludge obtained has been used as a landfill material which represents a substantial waste of valuable chromium values.

The use of chromic acid-sulfuric acid etchants in the fashion described above poses significant problems for the recovery of secondary resources and for pollution control. It is significant that the entire U.S. production of primary chromium is achieved from imported ores. In fact, more than 30,000 tons of chromium are employed annually for the oxidizing treatment of various surfaces and for corrosion control measures. Because of minimal recovery technology and because of the practices of the finishing industry which utilize Cr$^{+6}$ oxidizing solutions, substantial quantities of valuable secondary chromium materials are lost. Furthermore, waste chromium has long been recognized as a major pollution problem. In fact, the prevailing EPA regulations prevent the discharge of waste water containing more than 0.25 ppm Cr$^{+6}$ into sewers by plants discharging more than 10,000 gal/day of aqueous chromium wastes. Still further, suitable landfill areas for chromium hydroxide sludge materials are becoming increasingly scarce, and the collection, treatment and disposal of chromium waste by contractors is expensive.

In the past one method of treating exhausted hexavalent chromium oxidizing solutions as shown by Tarjanji et al. U.S. Pat. No. 3,728,238 has involved the electrolysis of such solutions in electrolysis cells containing anode and a cathode under conditions in which the hexavalent chromium is reduced to trivalent chromium. The electrolysis is conducted in a cell which contains a bed of particles having a porosity ranging from about 40% to 80%. The particles can be electrically non-conductive, conductive or semiductive and function by facilitating the reduction process. While the reference shows the reduction of chromium values in solution it does not show a technique whereby Cr$^{+6}$ and Cu$^{+2}$ values in solution can be simultaneously reduced without resorting to addition of chemicals to the electrolysis bath or to separation of the anolyte from the catholyte.

Another prior art technique of reducing Cr$^{+6}$ values in spent oxidizing solutions is shown by Gilby et al. U.S. Pat. No. 3,679,557. In this technique spent Cr$^{+6}$ solutions are electrolyzed in a cell equipped with a carbon particle cathode and a noble metal anode thereby achieving the reduction of Cr$^{+6}$ to Cr$^{+3}$. While an apparently high rate of Cr$^{+6}$ reduction can be achieved, the reference does not show or suggest a method by which Cr$^{+6}$ and Cu$^{+2}$ can both be simultaneously reduced in the same cell from solution so that copper can be electrowon and chromium can be reduced to a form suitable for disposal.

In a departure from the disclosures of the above discussed references, Bennion et al. U.S. Pat. No. 3,804,733 shows a technique of electrowinning copper from solutions also containing other impurity ions. In the technique the solution to be treated is passed through the cathode which is a carbon particle electrode while a reference electrolyte solution is passed through a carbon particle anode. The porous anode is provided with copper in ionizable form. As a direct current is impressed across the electrodes, copper in the solution to be treated is reduced to the metal while copper is oxidized to solution soluble form at the anode. Upon saturation of the cathode with reduced metal, the potential impressed across the electrode is reversed and the cell is regenerated. However, the reference provides no disclosure that an exhausted Cr$^{+6}$ oxidizing solution can be treated such that Cr$^{+6}$ values are reduced to Cr$^{+3}$ and that divalent copper is simultaneously electrowon. Therefore, a need continues to exist for a method in which exhausted hexavalent chromium solutions containing copper ions can be electrolytically treated in order to simultaneously remove copper ion and Cr$^{+6}$ values therefrom.

SUMMARY OF THE INVENTION

Accordingly, one object of the present invention is to provide an electrolysis technique by which residual Cr$^{+6}$ ions are reduced to trivalent chromium ions in exhausted hexavalent chromium oxidizing solutions and from which copper is simultaneously electrowon.

Briefly, this object and other objects of the present invention as hereinafter will become more readily apparent can be attained in a method in which hexavalent chromium ions in solution can be reduced to trivalent chromium while copper is simultaneously electrowon by placing an exhausted Cr$^{+6}$ etching or oxidizing solution containing copper ions and Cr$^{+3}$ ions in an electrolytic cell containing at least one pair of carbon particle electrodes, and forcefully flowing said exhausted solution through the electrodes and simultaneously impressing a direct current across said electrodes such that at the cathode divalent copper is reduced to copper metal and Cr$^{+6}$ values are reduced to trivalent chromium and at the anode water is oxidized to oxygen.

BRIEF DESCRIPTION OF THE DRAWING

A more complete appreciation of the invention and many of the attendant advantages thereof will be readily attained as the same becomes better understood by reference to the following detailed description when considered in connection with the accompanying drawing, wherein.

DETAILED DESCRIPTION OF THE PREFERRED EMBODIMENTS

In the process of the present invention acidic solutions containing hexavalent chromium ions and copper ions can be subjected to electrolysis such that $Cr^{+6}$ and copper ions are simultaneously reduced to trivalent chromium ions and copper metal respectively. Any solution which contains hexavalent chromium ions and copper ions can be treated by the present process. Solutions which are especially amenable to the treatment process of the present invention include exhausted sulfuric acid hexavalent chromium oxidizing solutions which have been employed in various metallurgical processes and in the etching of printed circuit boards and brass as well as plastic substrates. Such solutions contain various amounts of hexavalent chromium as well as trivalent chromium which has been produced by use of the oxidizing solution. Of course, the exhausted solutions contain other metal ion inpurities such as zinc, nickel, iron and the like, particularly copper ions.

Figure 1:
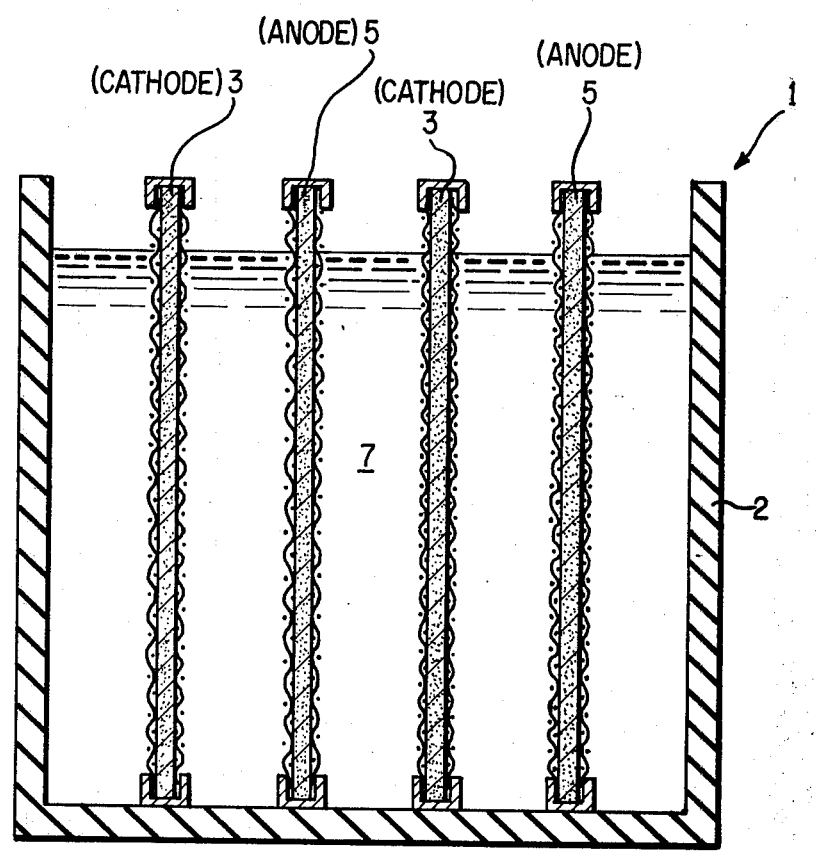
FIG. 1 shows an electrolytic cell containing two pair of carbon particle electrodes in which exhausted hexavalent chromium solutions can be treated according to the process of the present invention.

The method of the present invention can be better understood by reference to FIG. 1 which shows an embodiment of the electrolytic cell employed. Electrolytic cell 1 is shown equipped with two sets of electrodes which include cathodes 3 and anodes 5 in tank 2. The tank is shown with electrolyte solution 7 which is preferably an exhausted hexavalent chromium oxidizing solution. While the cell in FIG. 1 is shown with two pairs of electrodes, it is apparent that an effective cell can be formed from a single pair of electrodes or even three or more pairs of electrodes.

An important feature of the present invention is the construction of the electrodes. Both the anodes and cathodes are constructed of carbon particles, and the cell is operated in such a manner that electrolyte solution is forced through the electrodes as a direct current is impressed across the same. Flow of solution through the electrodes can be achieved in any convenient manner such as by the location of a piston or bellow pump outside the cell employed. During electrolysis hexavalent chromium is reduced to trivalent chromium and simultaneously divalent copper is reduced to copper metal at the cathode. At the anode, the principal reaction involves the oxidation of water to oxygen. Some carbon in the carbon particle electrodes is oxidized to $CO_2$ but this is a relatively minor reaction. Moreover, quite desirably the oxidation of $Cr^{+3}$, formed by cathodic reduction, to $Cr^{+6}$ does not occur. By means of the present process hexavalent chromium can be reduced to nontoxic trivalent chromium while copper is electrowon as copper metal at the cathode. After electrolysis copper metal can be recovered from the carbon particles of the cathode by any conventional pyrometallurgical process.

Figure 2:
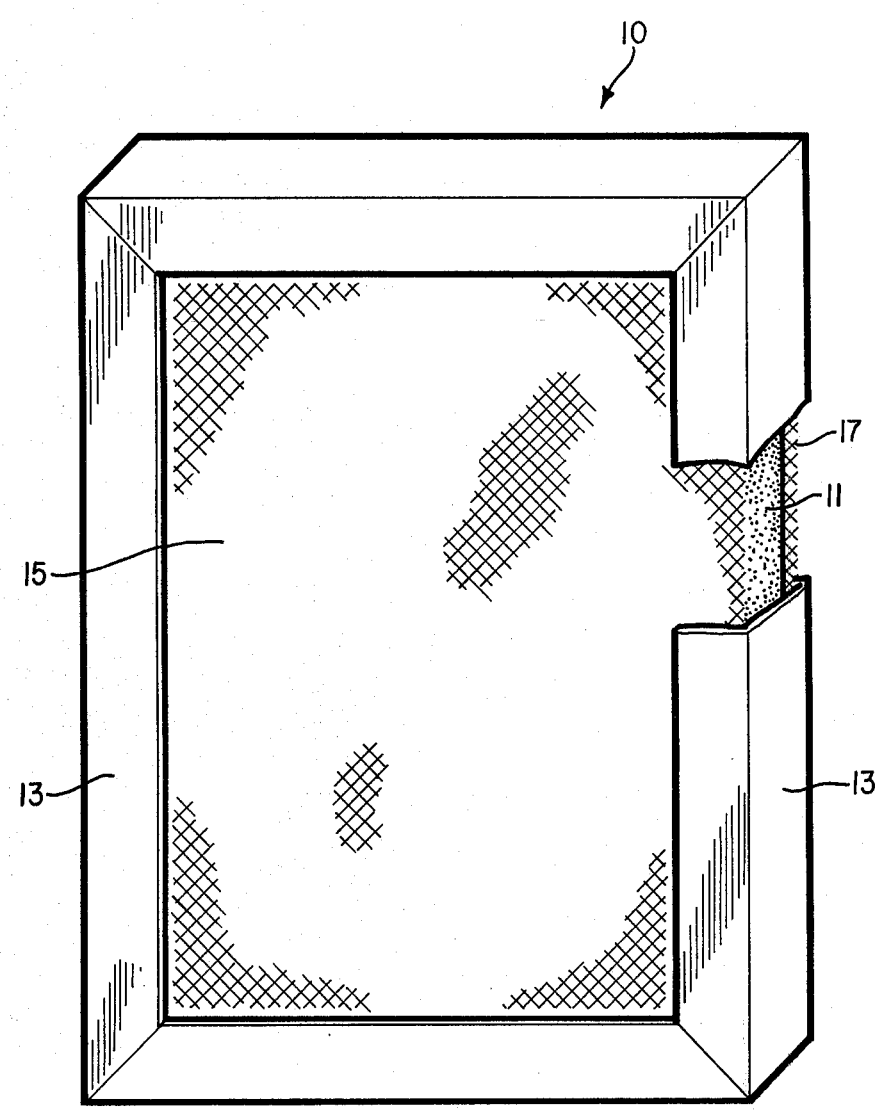
FIG. 2 is a diagram of a carbon particle electrode employed in the present invention.

The electrodes employed in the electrolytic cell employed in the present invention can be formed by any convenient technique. Referring to FIG. 2, in a preferred mode of fabricating the anode of the electrolysis cell, carbon particles 11 of a size ranging from minus 4 to plus 20 mesh, preferably minus 8 to plus 16 mesh are placed within the open area created by frame 13 and screens 15 and 17 on either face of the electrode structure. The carbon particles are suitably confined by such an electrode structure. Besides confining the carbon particles, the screens allow solution in the cell which is to be electrolyzed to freely flow through the carbon particles. The screens and framework structure of the anode should be formed from materials which are inert to electrolysis conditions. Thus, suitable materials from which the anode framework can be constructed include nonconductive plastic materials such as polyvinyl chloride, polypropylene, polyethylene, polyacrylates, polymethacrylates and the like. Of course, inorganic materials such as various glasses, ceramics and the like could also be used in the construction of the frames. Suitable materials useful for the construction of the anode screens include nonelectrically conducting polyolefin materials such as polypropylene, polyethylene, polyvinylchloride and the like. Electrical connection of the anode to a source of current can be achieved by inserting at least one conductive metal strip inert to the reaction solution and conditions into the carbon particle bed of the anode. Suitable conductive metals include such noble metals as platinum and palladium.

While the ratio of the surface area of the cathode to the anode is not critical, normally the ratio ranges from 2:1 to 1:1. Moreover, the thickness of the particle bed, while not critical, generally ranges from about 0.5 to 2 inches.

While carbon particle based cathodes have been employed in some electrolytic processes in the past, carbon particle anodes have apparently been used in few, if any, electrolytic processes. Yet the present process relies specifically on a carbon particle based anode because $Cr^{+3}$ is not reoxidized to $Cr^{+6}$ with such an electrode unlike the case of anodes formed from lead, lead-6% antimony, platinum and $PbO_2$ coated titanium.

The cathode of the cell is fabricated in a manner very similar to that of the anode, except that since reductive reactions occur at the cathode, the screens which confine the carbon particle bed in the framework of the cathode can be formed of such conductive metals as stainless steel, carbon steel, copper and the like. Simple electrical hook-up of the cathode to a source of current can then be achieved by attaching leads directly to both screens. Alternatively, both screens could be formed of a nonconductive material such as is used in anode fabrication and electrical connection assured by the placement of conductive metal strips in the carbon particle bed. The framework of the cathode can be formed of any suitable electrically conductive or non-conductive material with the only proviso being that it must be stable to the environment of the solution in the cell. If the framework is formed of an electrically conductive material such as stainless steel, care must be taken that the electrode is not short circuited to the electrolysis tank. The electrically nonconductive materials which can be used for framework construction of the cathode include the same materials employed for the fabrication of the anode framework.

The carbon particles employed in the construction of the electrodes can be derived from any convenient source as long as they are electrically conducting. Carbon particles can be derived from such suitable sources as metallurgical coke, petroleum coke, foundry coke, coke breeze and the like. preferably, the electrodes are formed from metallurgical coke of a particle size ranging from minus 8 mesh to plus 16 mesh. In an alternative embodiment conductive metallic particles can be mixed with the bed of carbon particles. Particles of a metal such as copper are suitable and may be mixed with the coke particles in an amount up to about 20 wt % of the total particulate material.

In the actual operation of the cell, an exhausted $Cr^{+6}$ oxidizing solution is placed in the cell and a direct current of a current density and potential sufficient to reduce divalent copper and hexavalent chromium at the cathode is impressed across cathode and anode pairs. Normally, a direct current of a density ranging from 1 to 5 amps/dm$^2$ at a potential ranging from 3 to 10 volts is sufficient to reduce the cationic species at the cathode. The reason why $Cr^{+3}$ ions produced at the cathode are not reoxidized at the anode has not yet been clearly established. However, it is believed that one of the following two explanations is likely. It is known that lead and some other metal ions in solution catalyze the oxidation of $Cr^{+3}$ to $Cr^{+6}$. Accordingly, because carbon particles are the basis of the anode, the anode can not act as a source for such metal ions in solution which would catalyze the reoxidation of $Cr^{30\ 3}$ ions. Alternatively, it may be that efficiency of the carbon particle anode is low, and whatever $Cr^{+6}$ is generated at the electrode is immediately reduced back to $Cr^{+3}$ by the coke. Electrolysis is continued until the desired metal ion species and all $Cr^{+6}$ ions have been reduced. The amount of copper reduced depends upon the economics of the electrolysis reaction. Normally, it is likely that the electrolysis unit will be operated in a continuous fashion so that the copper concentration in solution will remain constant, probably on the order of 1 to 2 g/l.

After electrolysis the solution in the cell is withdrawn and then neutralized resulting in the formation of a sludge which can be used as a landfill. Alternatively, the sludge could be pelletized and sold as a source of Cr for stainless steel production. Still further the $Cr^{+3}$ ions in solution could be reoxidized to $Cr^{+6}$ which could then be used in an etching solution.

Having generally described the invention, a more complete understanding can be obtained by reference to certain specific examples, which are included for purposes of illustration only and are not intended to be limiting unless otherwise specified.

EXAMPLE 1

In a cell of a construction shown in FIG. 1 was placed 20 l of exhausted $Cr^{+6}$ etching solution obtained by etching brass. The spent etchant placed in the cell had the composition shown in the table below. The cell consisted of anodes and cathodes composed of metallurgical coke which was ground and sized to minus 8- to plus 16-mesh. The anodes were fabricated by placing the coke particles in plexiglass frames provided on two opposite surfaces with polypropylene screens. Electrical contact with the anodes was provided by placing two small conductive platinum strips in the bed of particles in each anode. The cathodes were fabricated in a manner similar to that of the anodes except that stainless steel screens were used instead of polypropylene screens as used in the construction of the anodes. Electrical contact to the cathodes was simply achieved by attaching conductive leads directly to the metal screens. The total frontal area for both the cathodes and anodes was 2.1 ft$^2$ and the entire solution was pumped through the electrodes during electrolysis. The solution was electrolyzed for 24 to 48 hours at a current density of 42 amps at a potential of 4–6 volts. Analysis of the solution after 24 hours and 48 hours of electrolysis revealed the results shown in Table 1.

TABLE 1

| Etchant | Composition (g/l) | | | |
|---|---|---|---|---|
| | $Cr^{+6}$ | $Cr^{+3}$ | Zn | Cu |
| as received | 5.5 | 31 | 17 | 45 |
| after 24 hr. electrolysis | 0 | 40 | 20 | 1.6 |
| after 48 hr. electrolysis | 0 | 38 | 19 | 0.01 |

The results obtained above show a cell efficiency after 24 hours of electrolysis of 89% with copper removal after 24 hours being 96%.

EXAMPLE 2

The compositions of the spent etchants used in this example are presented in Table 2. Solution A is a typical spent, printed circuit board chromate etchant solution. Solution B is a typical spent brass chromate etchant solution. Originally both etchants were prepared from sodium dichromate and sulfuric acid. The compositions of etchants A and B are typical of solutions which have been used in the applications indicated, when they are ready to be discarded. The compositions given are not to be regarded as exact. It should be pointed out that quite frequently spent chromate solutions are determined by visual examination of the bath or product and not by chemical analysis.

TABLE 2

| Solution | Composition of spent etchants | | | | | | Other elements present as spectrographic trace |
|---|---|---|---|---|---|---|---|
| | Composition, g/l | | | | | | |
| | $Cr^{3+}$ | $Cr^{6+}$ | Cu | Zn | Na | $SO_4^{2-}$ | |
| A | 17 | 36 | 30 | TR[1] | 22 | 220 | Ca, Mg, Sn |
| B | 31 | 5.3 | 45 | 19 | 15 | 290 | Ca, Co, Fe, Mg, Mn, Ni, Pb, Si, Sn |

[1]Trace.

A. Coke-Electrode Cells

Three runs were conducted in a small coke-electrode cell each time using some of spent etchant solution A. Each cell contained one anode and one cathode. The cell was fabricated from Plexiglas and was semicircular and contained five compartments separated by four polypropylene screens that contained the petroleum coke (minus 8 plus-16-mesh). Electrical connection to the cathode was made using a strip of either nickel or copper. In some experiments, the coke was contained in a stainless steel basket which was then placed between a set of polypropylene screen dividers. The stainless steel basket served as the current carrier. This arrangement reduced corrosion of the current carriers at the electrolyte-air interface. A strip of lead was used as the anode current carrier.

The cell held 650 ml of solution. An additional 350 ml of spent etchant was kept in a separate container and circulated through the cell using a peristaltic pump. The circulation rate was 10 ml/min.

The current density of the cell during operation was 2.15 amp/dm$^2$. (The area was calculated as if the electrodes were solid. Only the electrode area which is directly opposite another electrode was counted.) The actual current in the small cell was 2.7 amp at 2.7 to 2.5 v. The current was kept constant throughout the operation of the cell. The voltage remained fairly constant throughout the trials.

The results obtained from three runs are shown in Table 3 below using the spent printed circuit board etchant each time in the above small cell in batch treatments. The efficiencies of the runs were calculated on the basis of the total equivalents of copper and $Cr^{3+}$ produced. These data indicate that simultaneous $Cr^{6+}$ reduction of $Cr^{3+}$ and copper deposition occurred with fairly good efficiencies. There were two major problems with this cell: severe corrosion of the current carriers and shorting. Anode and cathode surfaces were within 1.3 cm of each other. Growth of dendritic copper on the electrode surface usually shorted the cell out after about 48 hr of operation.

TABLE 3

| | Results of Batch tests in small cell | | | |
|---|---|---|---|---|
| Trial No. | Composition, g/l | | Time, hr | Current efficiency, pct |
| | $Cr^{3+}$ $Cr^{6+}$ Cu | | | |

| Trial No. | $Cr^{3+}$ | $Cr^{6+}$ | Cu | Time, hr | Current efficiency, pct |
|---|---|---|---|---|---|
| Spent Etchant At start: | 17 | 36 | 30 | 0 | — |
| 1 | 42 | 11 | 14 | 22 | 80 |
| 1 | 46 | 7.5 | 4.4 | 46 | 48 |
| 2 | 41 | 12 | 15 | 19 | 81 |

B. Large Coke-Electrode Cell

A large cell was constructed from a 30×30×30 cm polypropylene tank. The cell held two anodes and two cathodes, and is shown in FIG. 1. Metallurgical coke (minus 8-plus 16-mesh) was held in four 30×30×1.9 cm holders each of which was fitted with a polypropylene screen. Platinum strips imbedded in the coke anode served as current carriers. Copper strips imbedded in the cathode served the same purpose. This configuration solved the corrosion problem exhibited in the small cell. The electrode holders fitted snugly against the sides of the tank.

The operating volume of the cell was 20 liters. A variable flow positive displacement pump was used for electrolyte circulation. When the large cell was operated in a continuous fashion, a peristaltic pump was used to feed spent etchant. The spent electrolyte was allowed to overflow the cell.

The current density in the large cell was 2.15 amp/dm$^2$. (This quantity was calculated in the same way as for the small cell.) The current was 42 amp at between ~6 and 4 v. Voltage decreased as the operation proceeded.

Table 4 below shows the results of batch tests in the large cell at various circulation rates. Efficiencies appear to be better at lower circulation rates; however, dendritic copper growth on the cathode is less severe at higher rates. In 48 hr, only 0.02 g/l or less copper and no detectable amount of $Cr^{6+}$ remained in the treated etchant in all of the static runs. Variance in the amount of $Cr^{3+}$ and zinc in the solution is the result of volume changes during the electrolysis. (Water was added periodically to make up evaporation losses.) No shorting problems were encountered during the batch tests.

TABLE 4

| | Batch tests in large cell | | | | | | |
|---|---|---|---|---|---|---|---|
| Trial No. | Composition, g/l | | | | Circulation rate, ml/min | Time, hr | Current efficiency, pct |
| | $Cr^{3+}$ | $Cr^{6+}$ | Cu | Zn | | | |
| At Start: | 31 | 5.3 | 45 | 19 | — | 0 | — |
| 1 | 40 | ND[1] | 1.6 | 20 | 6.7 | 24 | 89 |
| 1 | 38 | ND | .01 | 19 | 6.7 | 48 | 46 |
| 2 | 37 | .17 | 2.4 | 22 | 30 | 24 | 86 |
| 2 | 37 | ND | .02 | 21 | 30 | 48 | 45 |
| 3 | 37 | .31 | 12 | 20 | 80 | 25 | 66 |
| 3 | 40 | ND | .02 | 21 | 80 | 48 | 45 |

[1]None Detected.

Continuous Operation In Large Coke-Electrode Cell

The results of continuous operation of the large cell are shown in Table 5. Twenty liters of spent brass etchant shown in Table 2 were placed in the cell and electrolyzed for 24 hr. Spent etchant was then fed into the cell at 14 ml/min and the treated etchant was removed through an overflow tube located near the top of the cell. Etchant in the cell was agitated by circulating the solution with a positive displacement pump at 100 ml/min. The circulation was from anode to cathode.

The higher circulation rate was chosen to minimize dendritic copper formation and subsequent shorting. No problems with shorting were encountered during the trial, but an examination of the cathodes after the run showed a substantial buildup of copper metal on the polypropylene screens. This copper buildup resulted in an increase in efficiency as the electrode was rendered more conductive.

Eighty-one pct of the copper was removed and 86 pct of the $Cr^{6+}$ was reduced to $Cr^{3+}$ in the continuous run. The cost of copper electrowinning is about 6.6 kwhr/kg (3kwhr/lb) for the spent brass etchant.

It appeared that no $Cr^{3+}$ was oxidized at the coke anode. It is possible that some $Cr^{6+}$ was formed and then immediately reduced. Small anode weight losses were observed.

TABLE 5

| | Continuous test in large cell | | | | |
|---|---|---|---|---|---|
| Time, hr | Voltage, v | Composition, g/l | | | |
| | | $Cr^{3+}$ | $Cr^{6+}$ | Cu | Zn |
| 0 | 5.9 | 31 | 6 | 45 | 19 |
| 24 | 4.8 | 39 | .53 | 15 | 22 |
| 48 | 4.4 | 38 | 1.2 | 9.5 | 21 |
| 72 | 4.3 | 38 | .85 | 5.5 | 21 |
| 96 | 3.9 | 40 | .71 | 4.2 | 21 |

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A method of reducing $Cr^{+6}$ to $Cr^{+3}$ and recovering copper values from spent chromium oxidizing solutions, comprising:

placing an exhausted $Cr^{+6}$ etching or oxidizing solution containing copper ions and $Cr^{+3}$ ions in an electrolytic cell containing at least one pair of carbon particle electrodes as the cathode and anode respectively; and forcefully flowing said exhausted solution through the electrodes and simultaneously impressing a direct current across said electrodes such that at the cathode divalent copper is reduced to copper metal and $Cr^{+6}$ values are reduced to trivalent chromium and at the anode water is oxidized to oxygen.

2. The method of claim 1, which further comprises, after said electrolysis, recovering plate copper from said cathode.

3. The method of claim 1, wherein the current impressed across said electrodes has a density of 1 to 5 amp/dm$^2$ at a potential ranging from 3 to 10 volts.

4. The method of claim 1, wherein the surface area of the cathode relative to the anode ranges from 2:1 to 1:1.

5. The method of claim 1, wherein said exhausted solution has a divalent copper ion concentration of 100 g/l to 1 g/l.

6. The method of claim 1, wherein the carbon particles in said electrodes range in size from minus 4 to plus 20 mesh.

7. The method of claim 1, wherein said carbon particles are metallurgical coke particles, petroleum coke particles, foundry coke particles or coke breeze particles.

8. The method of claim 1, wherein said exhausted $Cr^{+6}$ etching solution is derived from the etching of brass, printed circuit boards and plastic substrates by aqueous hexavalent chromium sulfuric acid solutions.

9. The method of claim 1, wherein said electrolysis is conducted for a time ranging from 4 to 96 hours.

* * * * *